G. H. PEEK.
CORN PLANTER.

No. 109,543.  Patented Nov. 22, 1870.

Witnesses:
Chas Jacobs
C. Alexander

Inventor:
G. H. Peek.
per
J. H. Alexander
Atty.

United States Patent Office.

GEORGE H. PEEK, OF EAST HAMBURG, NEW YORK.

Letters Patent No. 109,543, dated November 22, 1870.

IMPROVEMENT IN CORN-PLANTERS.

The Schedule referred to in these Letters Patent and making part of the same.

*To all whom it may concern:*

Be it known that I, GEORGE H. PEEK, of East Hamburg, in the county of Erie and State of New York, have invented certain new and useful Improvements in Corn-Planters; and I do hereby declare that the following is a full, clear, and exact description thereof, reference being had to the accompanying drawing and to the letters of reference marked thereon which form a part of this specification, in which—

Figure 1:
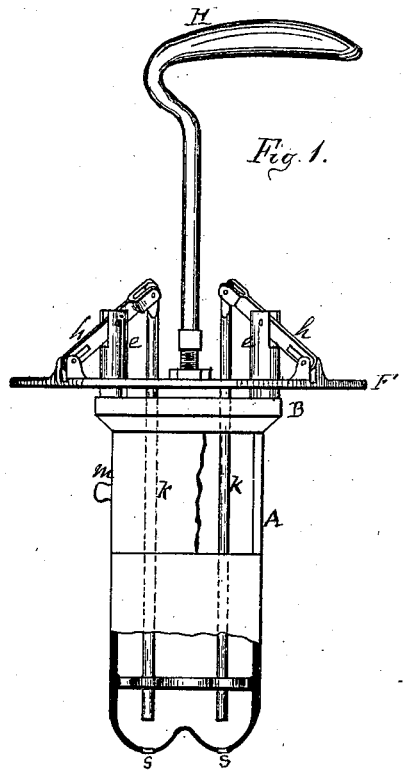
Figure 1 represents a vertical section of my corn-planter.
Figure 2:
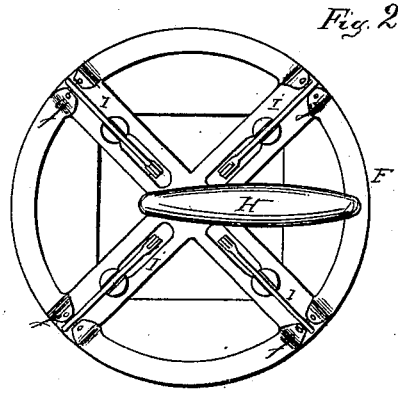
Figure 2 is a plan view of the same.

The letter A in the annexed drawing represents the body of my machine, which consists of an oblong quadrangular box having, at its lower end, four nipples, S, with perforations through them of sufficient size to admit of the passage of a grain of corn.

The box A is furnished with the square top B, which extends a suitable distance beyond the four sides of said box.

On the surface of B, and at each of its corners, is firmly secured an upright cylindrical guide, e.

F is a metallic wheel furnished with four equidistant arms, I, connected together at the center of F.

Each of these arms has a slot in it, the object of which will be hereinafter explained.

Near the outer end of said slots is a hole sufficiently large to admit of the free play of guides e when the wheel F is placed in position.

At the outer end of each of the arms I is a projection, g, having in it a vertical slot, for the purpose of receiving the lower end of a slotted lever, h, which is held in position by a pivot.

The lever h passes obliquely upward through a slot at the upper end of guides e, and is pivoted at its upper end to a rod or plunger, k.

The plungers k are designed to play in a direct line with the holes in the nipples s, and are made sufficiently long, when the planter is operated, to penetrate the said holes and force out the grains of corn.

H designates the handle by which my machine is operated, and is firmly secured to the arms at their point of intersection.

It will be observed that there are oblong slots in the top B, so as to admit of the free play of plungers k when my planter is operated.

m represents a sliding door, which covers the opening in the side of box A, for the introduction of the corn.

In operating my machine the lower end will be placed on the earth, the handle H raised, and with it the wheel F.

By this motion the levers h will be thrown in a horizontal position, causing the descent of plungers k, which will force the grains through the holes in nipples s and complete the process of planting.

Having thus described my invention,

What I claim, and desire to secure by Letters Patent, is—

1. The wheel F, provided with handle H, and arranged to operate the plungers k, substantially as set forth.

2. The slotted levers h, in combination with wheel F and plungers k, substantially as described.

3. The combination of seed-box A, constructed as described, and provided with upright guides e, in combination with wheel F, slotted levers h, and plungers k, all arranged as specified.

In testimony that I claim the foregoing as my own, I affix my signature in presence of two witnesses.

GEORGE H. PEEK.

Witnesses:
FRANK M. THORN,
CHAUNCY ABBOTT.